United States Patent [19]

Katayama

[11] Patent Number: 5,155,687

[45] Date of Patent: Oct. 13, 1992

[54] CRUISE CONTROL APPARATUS AND METHOD

[75] Inventor: Kazuyori Katayama, Himeji, Japan

[73] Assignee: Mitsubishi Denki K.K., Tokyo, Japan

[21] Appl. No.: 642,777

[22] Filed: Jan. 18, 1991

[30] Foreign Application Priority Data

Jan. 20, 1990 [JP] Japan .................................. 2-10811

[51] Int. Cl.$^5$ ............................................. B60K 31/04
[52] U.S. Cl. ................................. 364/426.04; 123/352; 180/179
[58] Field of Search ............... 364/426.01, 426.04, 364/431.07; 180/170, 177, 178, 179; 123/352

[56] References Cited

U.S. PATENT DOCUMENTS

| | | |
|---|---|---|
| 4,707,792 | 2/1987 | Naitou . |
| 4,735,273 | 4/1988 | Naito .................................. 180/179 |
| 4,835,696 | 5/1989 | Suzuki et al. .................... 364/426.04 |
| 4,926,334 | 5/1990 | Suzuki et al. .................... 364/426.04 |
| 4,931,939 | 6/1990 | Kawata et al. .................. 364/426.04 |
| 4,943,923 | 7/1990 | Naito .............................. 364/426.04 |
| 4,969,531 | 11/1990 | Hirakata et al. ..................... 180/179 |
| 4,982,805 | 1/1991 | Naitou et al. ........................ 180/179 |

Primary Examiner—Parshotam S. Lall
Assistant Examiner—Collin W. Park
Attorney, Agent, or Firm—Sughrue, Mion, Zinn Macpeak & Seas

[57] ABSTRACT

A cruise control apparatus for a vehicle periodically adjusts the opening of a throttle valve based on the function $K \cdot \epsilon + G \cdot \alpha$, wherein $\epsilon$ is the deviation of the vehicle speed from a target value, $\alpha$ is the vehicle acceleration, K is a constant, and G is a variable control coefficient. G increases with an increase in the length of time since a change in the sign of acceleration or the length of time since a change in the sign of the rate of change of acceleration.

13 Claims, 5 Drawing Sheets

CRUISE CONTROL APPARATUS AND METHOD

BACKGROUND OF THE INVENTION

This invention relates to a cruise control apparatus for an automotive vehicle. A cruise control apparatus is a device that enables the driver of a vehicle to select a desired target speed for the vehicle and then controls the output of the engine of the vehicle so as to maintain the selected target speed without the driver having to depress the accelerator pedal. A typical cruise control apparatus controls the engine output by varying the opening of the throttle valve of the engine.

Conventional cruise control apparatuses are able to perform fairly good control of vehicle speed when the vehicle is travelling on a level road. However, when the vehicle is travelling on a road which is not level, and particularly on one with a succession of upwards and downwards slopes, with a conventional cruise control apparatus, the deviation of the vehicle speed from the target speed becomes large, hunting of the engine frequently occurs, and the ride becomes uncomfortable for the passengers of the vehicle.

SUMMARY OF THE INVENTION

Accordingly, it is an object of the present invention to provide a cruise control apparatus for an automotive vehicle which can accurately maintain a target vehicle speed even when the vehicle is travelling on a road with a series of slopes.

It is another object of the present invention to provide a cruise control apparatus that can respond rapidly to deviation of the vehicle speed from a target speed.

It is still another object of the present invention to provide a cruise control apparatus that can provide a comfortable ride for passengers of the vehicle.

A cruise control apparatus for a vehicle according to the present invention has deviation determining means for determining the deviation $\epsilon$ of the vehicle speed from a target speed and an acceleration determining means for determining the acceleration $\alpha$ of the vehicle. A coefficient calculating means calculates a control coefficient G that increases with an increase in the length of time since a change in the sign of the acceleration $\alpha$ or a change in the sign of the rate of change of the acceleration $\alpha$. A throttle adjusting means adjusts the opening of a throttle valve of the vehicle based on the speed deviation $\epsilon$, the amount of adjustment increasing as the value of the control coefficient G increases.

In a preferred embodiment, the throttle valve opening is adjusted in a step-wise manner at prescribed intervals. The amount of each adjustment is proportional to $K \cdot \epsilon + G \cdot \alpha$, wherein K is a predetermined coefficient.

Because the amount of adjustment of the throttle valve opening depends on the time history of the acceleration of the vehicle, the throttle valve can be rapidly adjusted in response to deviations from the target speed, and the vehicle speed can be accurately maintained at the target speed.

DESCRIPTION OF THE PREFERRED EMBODIMENTS

Figure 1:
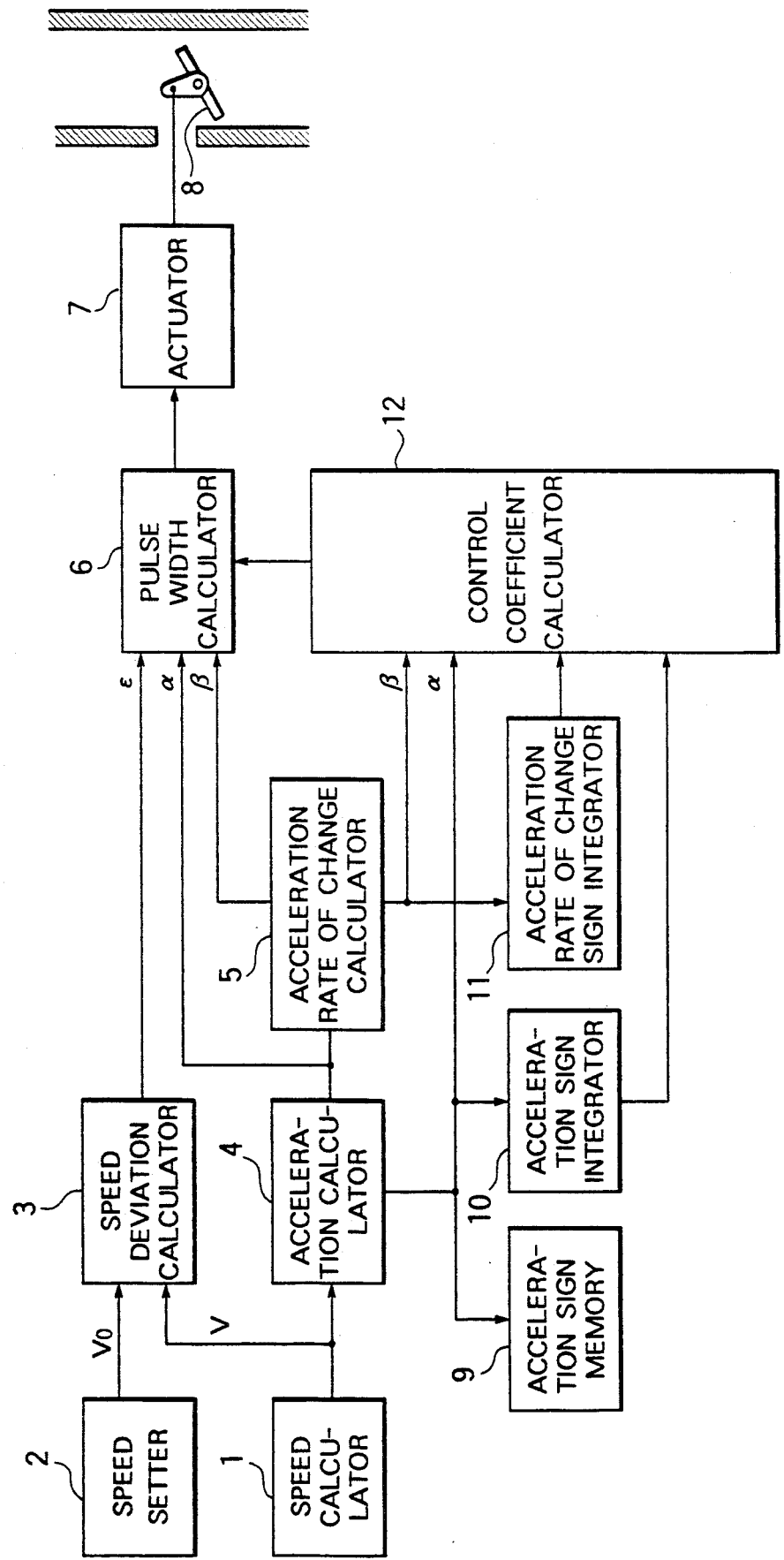
FIG. 1 is a block diagram conceptually illustrating an embodiment of a cruise control apparatus according to the present invention.

A preferred embodiment of a cruise control apparatus according to the present invention will now be described while referring to the accompanying drawings. FIG. 1 is a block diagram conceptually illustrating this embodiment. It includes a speed calculator 1 that calculates the speed V of an unillustrated vehicle, such as a passenger car, on which the cruise control apparatus is mounted and generates a corresponding electrical output signal. A speed setter 2, which is a device operated by the driver of the vehicle, generates an electrical output signal indicative of a target speed $V_o$ at which the driver wishes the vehicle to run. The output signals from the speed calculator 1 and the speed setter 2 are input to a speed deviation calculator 3, which calculates the deviation $\epsilon$ of the actual vehicle speed V, indicated by the output signal of the speed calculator 1, from the target speed $V_o$, indicated by the output signal from the speed setter 2, and generates a corresponding electrical output signal. The output signal from the speed calculator 1 is also input to an acceleration calculator 4 that calculates the vehicle acceleration $\alpha$ based on the vehicle speed determined by the speed calculator 1 and generates a corresponding output signal. The output signal from the acceleration calculator 4 is input to an acceleration rate of change calculator 5 that calculates the time rate of change $\beta$ of the acceleration $\alpha$ and generates a corresponding output signal.

The output signals from the speed deviation calculator 3, the acceleration calculator 4, and the acceleration rate of change calculator 5 are input to a pulse width calculator 6 that generates a control signal having a prescribed pulse width for controlling an actuator 7. The actuator 7 opens and closes the throttle valve 8 of an unillustrated carburetor for the engine of the vehicle in accordance with the control signal. The pulse width of the control signal from the pulse width calculator 6 determines the amount by which the actuator 7 changes the degree of opening of the throttle valve 8.

The output signal from the acceleration calculator 4 is input to an acceleration sign memory 9, an acceleration sign integrator 10, and a control coefficient calculator 12. The acceleration sign memory 9 stores a value indicating the sign (positive or negative) of the vehicle acceleration $\alpha$ during a prescribed period. The acceleration sign integrator 10 calculates an acceleration sign counter C$\alpha$ that indicates the length of time since a change in the sign of the acceleration $\alpha$. The acceleration sign counter C$\alpha$ is incremented at regular intervals when the sign of the acceleration $\alpha$ remains constant.

The output signal from the acceleration rate of change calculator 5 is input to an acceleration rate of change sign integrator 11 and the control coefficient calculator 12. The acceleration rate of change sign integrator 11 calculates an acceleration rate of change sign count C$\beta$ that indicates the length of time since a change in the sign of the acceleration rate of change $\beta$. The acceleration rate of change sign count C$\beta$ is incremented at regular intervals when the sign of the acceleration rate of change remains constant.

The control coefficient calculator 12 calculates a control coefficient G based on the acceleration sign count Cα and the acceleration rate of change sign count Cβ and provides the control coefficient G to the pulse width calculator 6. The pulse width calculator 6 then generates a control signal in the form of a pulse having a pulse width $T_c$ given by the formula $$T_c = K \cdot \epsilon + G \cdot \alpha$$

wherein K is a predetermined control coefficient. In the present embodiment, K is a constant.

Figure 2:
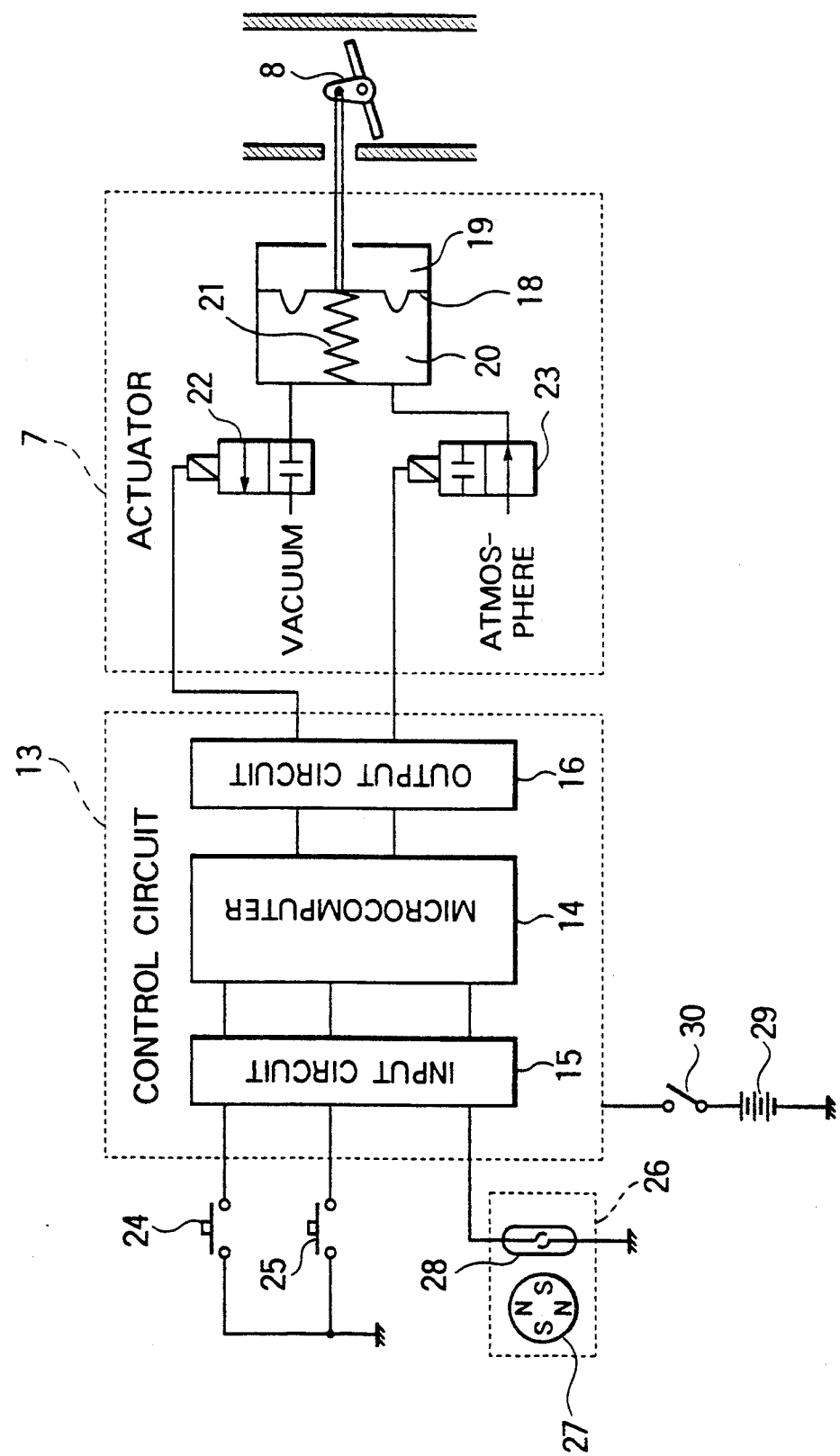
FIG. 2 is a schematic diagram of a concrete example of the embodiment of FIG. 1.

FIG. 2 is a block diagram of a more concrete example of the structure of the embodiment of FIG. 1. In this example, elements 1–6 and 8–12 of FIG. 1 comprise an electronic control unit 13 comprising an electronic processor such as a microcomputer 14, an input circuit 15 for processing input signals and providing them to the microcomputer 14, and an output circuit 16 that actually operates the actuator 7 in response to command signals from the microcomputer 14. The microcomputer 14 includes various memories for storing programs and data. The driver of the vehicle can initiate cruise control by momentarily closing a set switch 24. The vehicle speed at the time the set switch 24 is closed becomes a target speed. Cruise control is cancelled when a cancel switch 25 is momentarily closed. The cancel switch 25 can be linked to the brake pedal of the vehicle so that cruise control is automatically halted whenever the brake is depressed. The control unit 13 receives a speed signal from a speed sensor 26 comprising a rotating magnet 27 having a plurality of poles (four, for example) and a reed switch 28 that can be opened and closed magnetically. The magnet 27 is connected to some portion of the vehicle so as to rotate at a speed proportional to the vehicle speed. For example, the magnet 27 can be attached to a speedometer cable so as to rotate at a speed proportional to the rotational speed of the wheels of the vehicle. The reed switch 28 opens and closes as the magnet 27 rotates and generates an electrical output signal having a frequency proportional to the rotational speed of the magnet 27 and therefore proportional to the speed of the vehicle. In the illustrated embodiment, the speed sensor 26 generates four output pulses for each rotation of the magnet 27. Power is supplied to the control unit 13 from a battery 29 of the vehicle via a power switch 30.

The actuator 7 is a pneumatic device having two chambers 19 and 20 that are separated and hermetically sealed from one another by a movable diaphragm 18. The diaphragm 18 is linked to the throttle valve 8 so that movement of the diaphragm 18 to the left in FIG. 2 will cause the throttle valve 8 to open while movement to the right will cause the throttle valve 8 to close. The diaphragm 18 is biased towards the right in FIG. 2 by a biasing spring 21. Chamber 19 communicates with the atmosphere, while chamber 20 can be connected either to an unillustrated source of negative pressure or to the atmosphere by a first solenoid valve 22 or a second solenoid valve 23, respectively. The solenoid valves 22 and 23 are individually controlled by output signals from the control unit 13.

The actuator 7 has three different modes of operation: an open mode in which the degree of opening of the throttle valve 8 is increased, a close mode in which the degree of opening of the throttle valve 8 is decreased, and a maintenance mode in which the degree of opening of the throttle valve 8 is maintained constant. In the open mode, the first solenoid valve 22 is opened and the second solenoid valve 23 is closed. As a result, chamber 20 communicates with the source of negative pressure, so the diaphragm 18 is moved to the left and the throttle valve 8 moves towards an open position. In the close mode, the second solenoid valve 23 is opened and the first solenoid valve 22 is closed. Accordingly, chamber 20 communicates with the atmosphere, so the diaphragm 18 is moved to the right and the throttle valve 8 moves towards a closed position. In the maintenance mode, both solenoid valves 22 and 23 are closed. Therefore, chamber 20 is sealed and the pressure within chamber 20 remains constant, so the positions of the diaphragm 18 and the throttle valve 8 remain unchanged from their positions at the start of the maintenance mode of operation.

Figure 3:
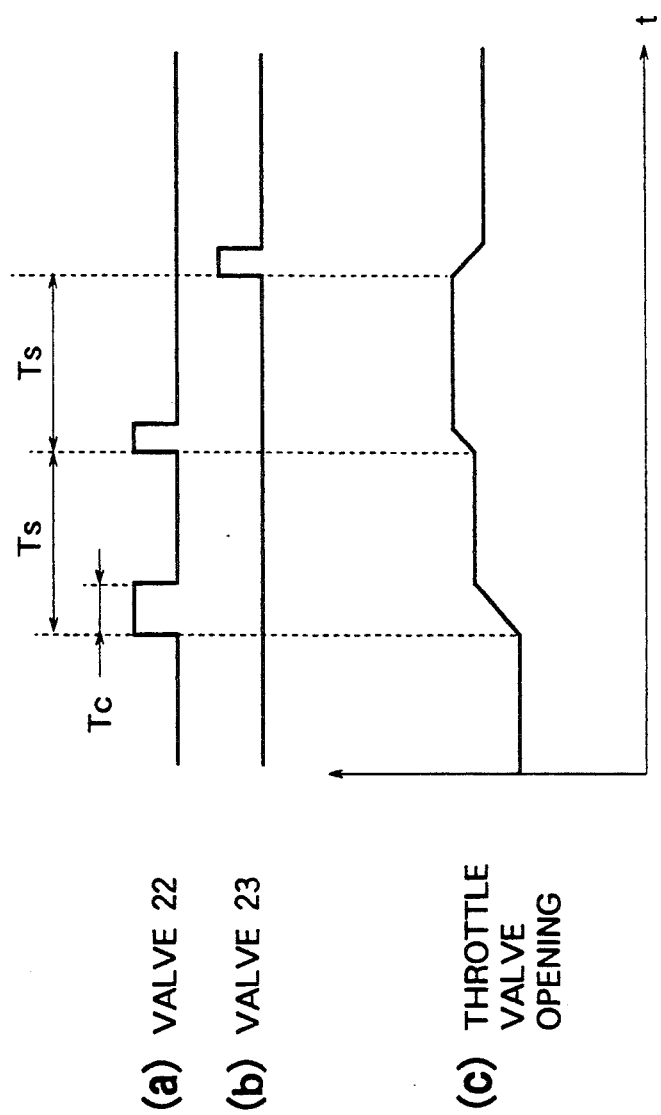
FIG. 3 is a timing diagram showing the control signals applied to the actuator and the resulting operation of the throttle valve of FIG. 2.

FIG. 3 is a timing diagram illustrating the operation of the throttle valve 8. At regular time intervals $T_s$, the control unit 13 generates a control pulse for the actuator 7 having a pulse width $T_c$. If the control pulse is applied to the first solenoid valve 22, the degree of opening of the throttle valve 8 is increased, and if the control pulse is applied to the second solenoid valve 23, the degree of opening of the throttle valve 8 is decreased. If no control pulse is applied to either solenoid valve, the throttle valve opening remains unchanged. Furthermore, since both solenoid valves are closed upon the falling edge of a pulse, the degree of opening of the throttle valve 8 is maintained constant until the next pulse is generated. The amount of change in the degree of opening of the throttle valve 8 produced by each control pulse corresponds to the pulse width $T_c$. The greater the pulse width $T_c$, the larger the amount of change.

Figure 4:
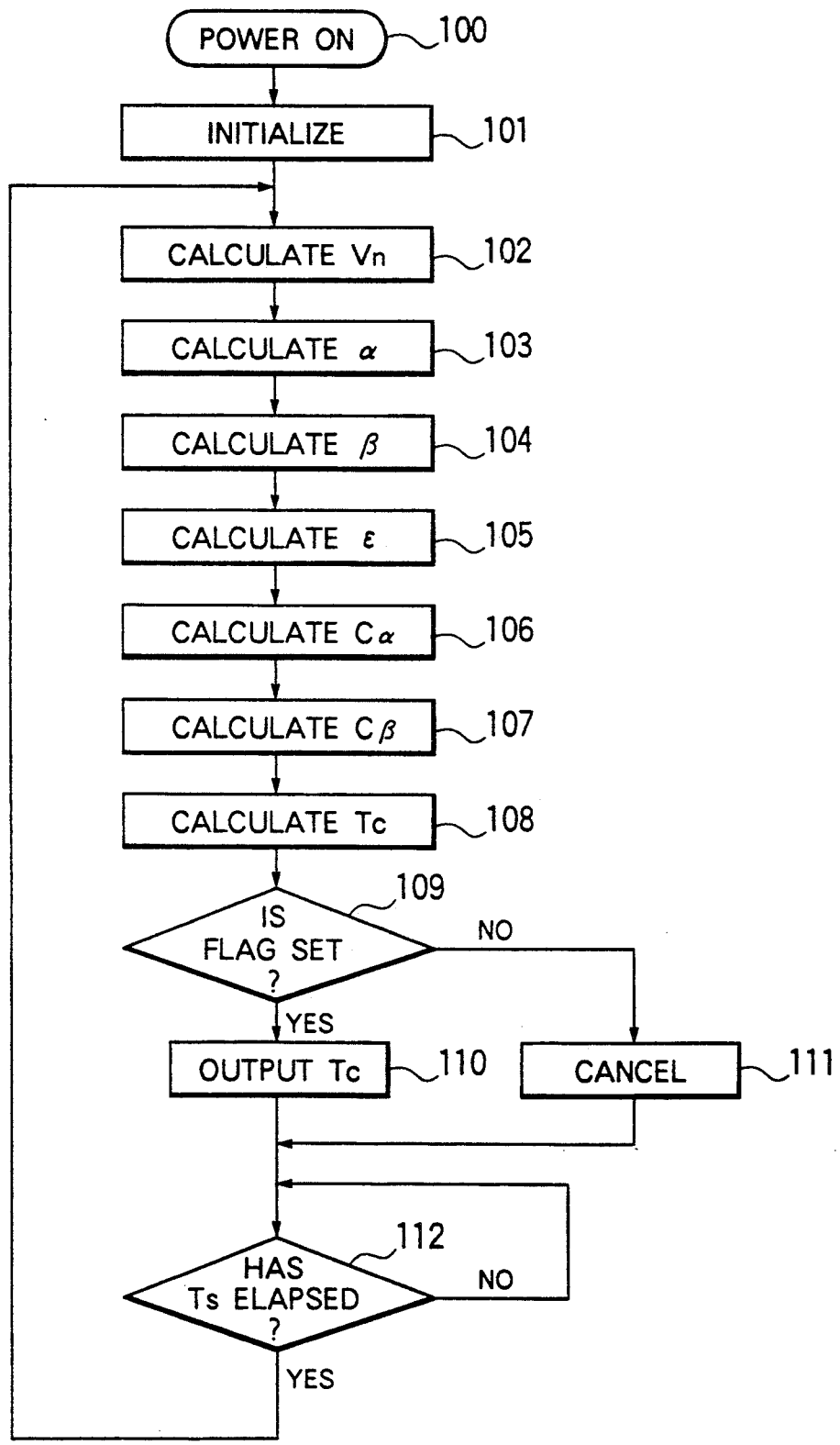
FIG. 4 is a flow chart of a main program executed by the control circuit of FIG. 2.

FIG. 4 is a flow chart illustrating an example of a main program that can be run by the microcomputer 14 of the embodiment of FIG. 2 to perform cruise control of a vehicle. In Step 100, the power switch 30 is closed, and the control unit 13 is energized by an unillustrated power-on circuit. In Step 101, the control unit 13 initializes its internal memories, the input and output circuits 15 and 16, and the like. Until the completion of initialization, the main program does not respond to interrupt requests.

Steps 102–112 of FIG. 4 comprises a loop that is performed at intervals of $T_s$ seconds. In Step 102, the vehicle speed $V_n$ during the current cycle of the loop is calculated based on the period $\Delta t$ between consecutive input pulses from the speed sensor 26. The period $\Delta t$ is calculated by an interrupt routine shown in FIG. 5A (to be described later) each time a pulse is received from the speed sensor 26. Since the magnet 27 of the speed sensor 26 is secured to the speedometer cable, the distance travelled by the vehicle between output pulses of the speed sensor 26 is a predetermined constant. Accordingly, the vehicle speed $V_n$ can be calculated by dividing this distance by the period $\Delta t$. In Step 103, the acceleration $\alpha_n$ of the vehicle during the current cycle of the loop is calculated based on the vehicle speed $V_n$ found in Step 102 and the vehicle speed during the preceding cycle. Since the loop is performed every $T_s$ seconds, the acceleration is found by the formula $$\alpha_n = (V_n - V_{n-1})/T_s$$

wherein $V_{n-1}$ is the vehicle speed during the previous cycle of the loop.

In Step 104, the rate of change of acceleration $\beta_n$ (also referred to as the acceleration change rate) during the current cycle is found from the acceleration using the formula $$\beta_n = (a_n - a_{n-1})/T_s$$

wherein $a_{n-1}$ is the acceleration during the previous cycle of the loop.

In Step 105, the deviation $\epsilon$ of the vehicle speed $V_n$ from a target speed $V_o$ is found by the formula $$\epsilon = V_n - V_o.$$

Figure 5:
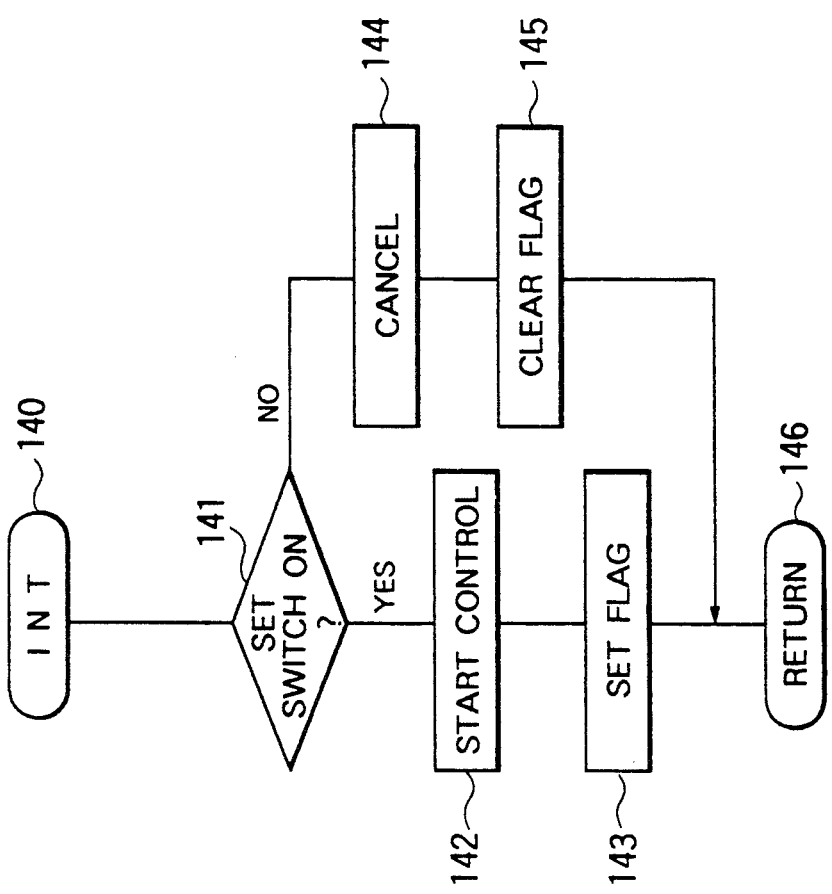
FIGS. 5A and 5B are flow charts of interrupt routines performed by the control circuit of FIG. 2.
Figure 5:
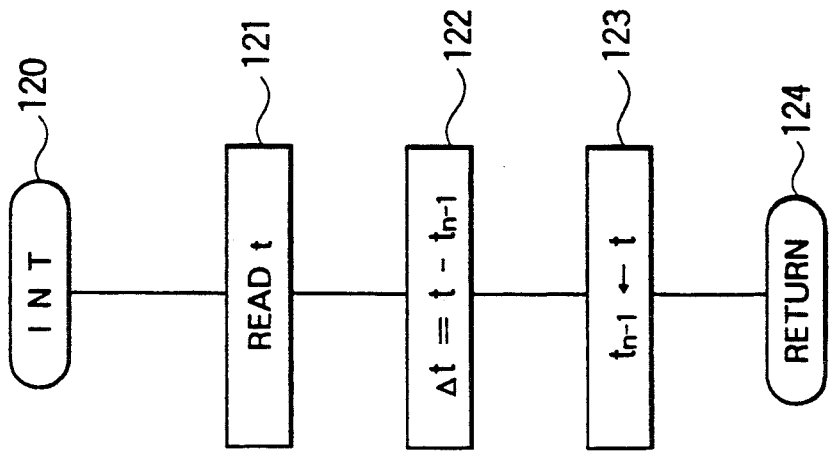

The target speed $V_o$ is determined by an interrupt routine illustrated in FIG. 5B that is performed each time the set switch 24 is closed.

In Step 106, based on the sign of the acceleration $\alpha_n$ calculated in Step 103, the acceleration sign count $C\alpha_n$ is corrected. The acceleration sign count $C\alpha_n$ indicates the length of time since a change in the sign (positive or negative) of the acceleration $\alpha$. It is calculated according to the following method:

(a) When $\alpha_n$ and $\alpha_{n-1}$ are of the same sign (for example, both positive or both negative), then $$C\alpha_n = C\alpha_{n-1} - 1$$

wherein $C\alpha_{n-1}$ is the value of the acceleration sign count during the previous cycle of the loop.

(b) When $\alpha_n$ and $\alpha_{n-1}$ are of different signs, then $$C\alpha_n = 0.$$

(c) When $\alpha$ is zero, then $$C\alpha_n = C\alpha_{n-1}.$$

Next, in Step 107, the acceleration rate of change sign count $C\beta$ is calculated based on the sign of the acceleration rate of change $\beta$ calculated in Step 104. The acceleration rate of change count $C\beta$ indicates the length of time since a change in the sign (positive or negative) of the acceleration rate of change $\beta$ and is calculated in the following manner:

(a) When $\beta_n$ and $\beta_{n-1}$ are of the same sign, then $$C\beta_n = C\beta_{n-1} + 1$$

wherein $C\beta_{n-1}$ is the value of the acceleration rate of change sign count and $\beta_{n-1}$ is the acceleration rate of change during the previous cycle of the loop.

(b) When $\beta_n$ and $\beta_{n-1}$ are of different signs, then $$C\beta_n = 0.$$

(c) When $\beta_n = 0$, then $$C\beta_n = C\beta_{n-1}.$$

Next, in Step 108, the pulse width $T_c$ of the control signal applied to the actuator 7 is calculated. As mentioned above, $T_c$ is expressed by the formula $T_c = K \cdot \epsilon + G \cdot \alpha$, wherein K is a control coefficient having a predetermined constant value and G is a control coefficient determined on the basis of $C\alpha$ and $C\beta$. More specifically, in this example, G can have one of 4 values $G_1$–$G_4$ depending on the magnitude of $C\alpha$ and $C\beta$. The value of $T_c$ is expressed as follows:

(a) When $C\alpha < N_1$, then $$T_c = K \cdot \epsilon + G_1 \cdot \alpha \text{ (when } C\beta < N_2\text{) and}$$

$$T_c = K \cdot \epsilon + G_2 \cdot \alpha \text{ (when } C\epsilon < N_2\text{)}$$

(b) When $C\alpha \geq N_1$, then $$T_c = K \cdot \epsilon + G_3 \cdot \alpha \text{ (when } C\epsilon < N_2\text{) and}$$

$$T_c = K \cdot \epsilon + G_4 \cdot \alpha \text{ (when } C\epsilon \geq N_2\text{).}$$

In these equations, $N_1$ and $N_2$ are predetermined constants. Furthermore, $G_1 < G_2 < G_3 < G_4$.

When the value of $T_c$ given by the above equations is positive, a pulse have a pulse width of $T_c$ is output to the first solenoid valve 22 to increase the degree of opening of the throttle valve 8. When the value of $T_c$ is negative, then a pulse having a pulse width equal to the absolute value of $T_c$ ($|T_c|$) is applied to the second solenoid valve 23 to decrease the degree of opening of the throttle valve 8. When $T_c = 0$, both solenoid valves remain closed, and the previous setting of the throttle valve 8 is maintained.

In Step 109, it is checked whether a cruise control flag is set, indicating that cruise control is being performed. If the flag is set, then in Step 110, a pulse having a pulse width $|T_c|$ is output to the appropriate solenoid valve of the actuator 7 to adjust the setting of the throttle valve 8. If the cruise control flag is not set, then in Step 111, cruise control is cancelled. The cancellation of cruise control can include a step such as controlling the actuator 7 so as to decrease the degree of opening of the throttle valve 8. Then, in Step 112, the program waits until a length of time $T_s$ has elapsed since the start of the present cycle of the loop. When time $T_s$ elapses, the program recycles to Step 102, and the loop of steps 102–112 is performed once again.

FIGS. 5A and 5B illustrate interrupt routines performed by the microcomputer 14 of the control unit 13 during the execution of the program of FIG. 4. Each time a pulse is input from the speed sensor 26, the interrupt routine of FIG. 5A is performed. In Step 120, the routine is entered from the main program of FIG. 4. In Step 121, the time t of the most recent output pulse of the speed sensor 26 is read from an internal timer. In Step 122, the time difference $\Delta t$ between the time t of the most recent output pulse and the time $t_{n-1}$ of the preceding output pulse of the speed sensor 26 is calculated and stored in memory. The difference $\Delta t$ is used in Step 102 of FIG. 4 to calculate the vehicle speed. In Step 123, the present time t is stored in a register as the previous time $t_{n-1}$ for use the next time the interrupt routine is performed, and in Step 124, a return is performed to the main program.

FIG. 5B illustrates an interrupt routine performed by the microcomputer 14 each time either one of switches 24 or 25 is closed. In Step 140, the routine is entered from the main program of FIG. 4. In Step 141, it is determined whether it was the set switch 24 that was closed. If it was, then in Step 142, the present vehicle speed is stored in memory as a target speed $V_o$ and cruise control initiation (such as initiation of the actuator 7) is carried out. In Step 143, a cruise control flag is set to indicate that cruise control is being performed, and then a return is performed in Step 146. If in Step 141 it is determined that it was not the set switch 24 that was closed, it follows that the cancel switch 25 was closed, so in Step 144, cancel processing is carried so as to cancel cruise control. The cancel processing can comprise, for example, controlling the actuator 7 to fully close the throttle valve 7. In Step 145, the cruise control flag is cleared to indicate that cruise control is not being performed, and in Step 146 a return is performed.

The larger the magnitude of the absolute value of $T_c$, the faster the rate at which the degree of opening of the throttle valve 8 is adjusted. From the above equations for $T_c$, it can be seen that the larger the value of the deviation $\epsilon$ or the acceleration $\alpha$, the faster is the rate of adjustment of the throttle valve 8 (and of the vehicle speed). Furthermore, the rate of adjustment of the throttle valve 8 (and the vehicle speed) also increases as $C\alpha$ or $C\beta$ increases.

As a result, when the vehicle speed continuously deviates from the target speed during cruise control due to variations in resistance to vehicle movement and other causes, i.e., when the drive force of the engine becomes much larger or smaller than the resistance to vehicle movement, the value of the acceleration sign counter $C\alpha$ and the acceleration rate of change sign counter $C\beta$ will increase. As a result, the pulse width $T_c$ of the control pulse applied to the actuator 7 will increase, and the speed deviation can be promptly reduced.

The acceleration sign count $C\alpha$ and the acceleration rate of change sign count $C\beta$ give the past history of speed variations of the vehicle, so in effect, the opening of the throttle valve 8 is adjusted based on the speed history of the vehicle.

In the above-described embodiment, the control coefficient G can have one of four discrete values $G_1-G_4$ depending on the values of $C\alpha$ and $C\beta$. However, the control coefficient G need not be limited to only four different values, and a larger or smaller number of values is possible. In addition, it is possible for the control coefficient G to be a continuous function of $C\alpha$ and $C\beta$ rather than a step-wise function as in the preceding example.

Furthermore, in the above-described embodiment, the control coefficient K which is multiplied by the speed deviation $\epsilon$ has a constant value. However, this control coefficient can also be varied in accordance with $C\alpha$ and $C\beta$, in which case the responsiveness of the cruise control apparatus can be further increased.

The embodiment of FIG. 2 employs a pneumatic actuator 7 to control the movement of the throttle valve 8, but the present invention is not restricted to a specific type of actuator. For example, the throttle valve 8 can be opened and closed by an electric motor controlled by the control unit 13.

What is claimed is:

1. A cruise control apparatus for a vehicle comprising:
   speed sensing means for sensing a speed of the vehicle;
   deviation determining means for determining the deviation $\epsilon$ of the vehicle speed from a target speed;
   acceleration determining means for determining an acceleration $\alpha$ of the vehicle;
   acceleration change rate determining means for determining an acceleration change rate $\beta$ of the vehicle;
   coefficient calculating means for calculating a control coefficient G that increases with an increase in a length of time since a change in the sign of the acceleration $\alpha$ or with an increase in a length of time since a change in the sign of the vehicle acceleration change rate $\beta$; and
   throttle valve adjusting means for adjusting a throttle valve opening of the vehicle based on the deviation $\epsilon$, the amount of adjustment increasing as G increases.

2. A cruise control apparatus as claimed in claim 1 wherein the throttle adjusting means comprises means for adjusting the opening of the throttle valve in a stepwise manner at prescribed intervals, the amount of each adjustment being proportional to $K\cdot\epsilon + G\cdot\alpha$, wherein K is a control coefficient.

3. A cruise control apparatus as claimed in claim 1 wherein the coefficient calculating means comprises means for calculating an acceleration sign count $C\alpha$ that is incremented at prescribed intervals when the sign of the vehicle acceleration remains constant, means for calculating an acceleration change rate sign count $C\beta$ that is incremented at prescribed intervals when the sign of the vehicle acceleration change rate remains constant, and means for calculating the control coefficient G as a function of $C\alpha$ and $C\beta$, the control coefficient G increasing with an increase in $C\alpha$ or $C\beta$.

4. A cruise control apparatus as in claim 1, further comprising:
   a first integrator for incrementing an acceleration sign count when the sign of the vehicle acceleration remains constant; and
   a second integrator for incrementing an acceleration change rate sign count when the sign of the vehicle acceleration change rate remains constant.

5. A cruise control apparatus as in claim 4, wherein said coefficient calculator increases said control coefficient as said acceleration sign count increases.

6. A cruise control apparatus as in claim 4, wherein said coefficient calculator increases said control coefficient as said acceleration change rate sign count increases.

7. A cruise control apparatus as in claim 1, wherein said control coefficient increases as the length of time, in which the sign of said vehicle acceleration remains unchanged, increases.

8. A cruise control apparatus as in claim 1, wherein said control coefficient increases as the length of time, in which the sign of said vehicle acceleration change rate remains unchanged, increases.

9. A cruise control apparatus as in claim 1, further comprising:
   means for incrementing an acceleration sign count when the sign of the vehicle acceleration remains constant, wherein said control coefficient is increased from one of first and second control coefficients to one of third and fourth control coefficients when said acceleration rate sign count is incremented to a value greater than or equal to a first threshold.

10. A cruise control apparatus as in claim 1, further comprising:
    means for incrementing an acceleration change rate sign count when the sign of the vehicle acceleration change rate remains constant, wherein said control coefficient is increased from a first control coefficient to a second control coefficient when said acceleration change rate sign count is incremented to a value greater than or equal to a second threshold.

11. A cruise control apparatus as in claim 1, further comprising a pulse width calculator which generates a pulse to control the control throttle valve, wherein a width of said pulse is increased when the control coefficient increases.

12. A cruise control method for a vehicle comprising:
determining an acceleration $\alpha$ of the vehicle;
determining a vehicle acceleration change rate $\beta$;
determining a control coefficient G that increases with an increase in the length of time since either a change in the sign of said vehicle acceleration or a change in the sign of the vehicle acceleration change rate; and
adjusting a throttle valve opening of the vehicle by an amount that increases as the control coefficient G increases.

13. A cruise control method as claimed in claim 12 further comprising determining the speed of the vehicle and the deviation $\epsilon$ of the vehicle speed from a target value, wherein the throttle valve is adjusted at prescribed intervals by an amount proportional to $K\cdot\epsilon + G\cdot\alpha$, wherein K is a predetermined coefficient.

* * * * *